United States Patent [19]

Kluth

[11] Patent Number: 4,569,409

[45] Date of Patent: Feb. 11, 1986

[54] STAIR CLIMBING WHEELCHAIR

[76] Inventor: Heinz Kluth, Kölnerstr. 338, D-4000 Düsseldorf, Fed. Rep. of Germany

[21] Appl. No.: 511,162

[22] Filed: Jul. 5, 1983

[30] Foreign Application Priority Data

Jul. 7, 1982 [DE] Fed. Rep. of Germany ....... 3225354

[51] Int. Cl.[4] .............................................. B62D 61/12

[52] U.S. Cl. .................................... 180/8.2; 280/5.28; 280/DIG. 10

[58] Field of Search ............... 280/5.28, 5.2, DIG. 10; 180/8.1, 8.2, 209

[56] References Cited

U.S. PATENT DOCUMENTS 3,438,641 4/1969 Bradley .............................. 280/5.28

3,592,282 7/1971 Soileau ........................... 280/5.28 X

FOREIGN PATENT DOCUMENTS 2524717 12/1976 Fed. Rep. of Germany ....... 180/8.2

2232475 1/1975 France ............................... 280/5.28

*Primary Examiner*—John A. Pekar

*Attorney, Agent, or Firm*—Marmorek, Guttman & Rubenstein

[57] ABSTRACT

A wheelchair for handicapped persons with a seat disposed on a movable frame, a battery set for the power supply of drive motors coordinated to the wheels of the wheelchair and a steering system for controlling the stop of the wheel groups for the purpose that the wheelchair can drive up and down stairs automatically, which is characterized in that the movable frame comprises two frames disposed on top of each other, which carry a compressed air container with coordinated compressor and where vertically standing double acting piston cylinder units hinged at the longitudinal side pieces for the vertical adjustment of eight wheelchair wheels combined to four wheel groups, such that the frames with the piston cylinder units are adjustable relative to their side projection like a parallelogram, that the seat is hinged at the upper frame, and where a stabilization system is coordinated to the seat under maintaining of its horizontal position at different relative positions of the upper and lower frames.

13 Claims, 7 Drawing Figures

Figure 1:
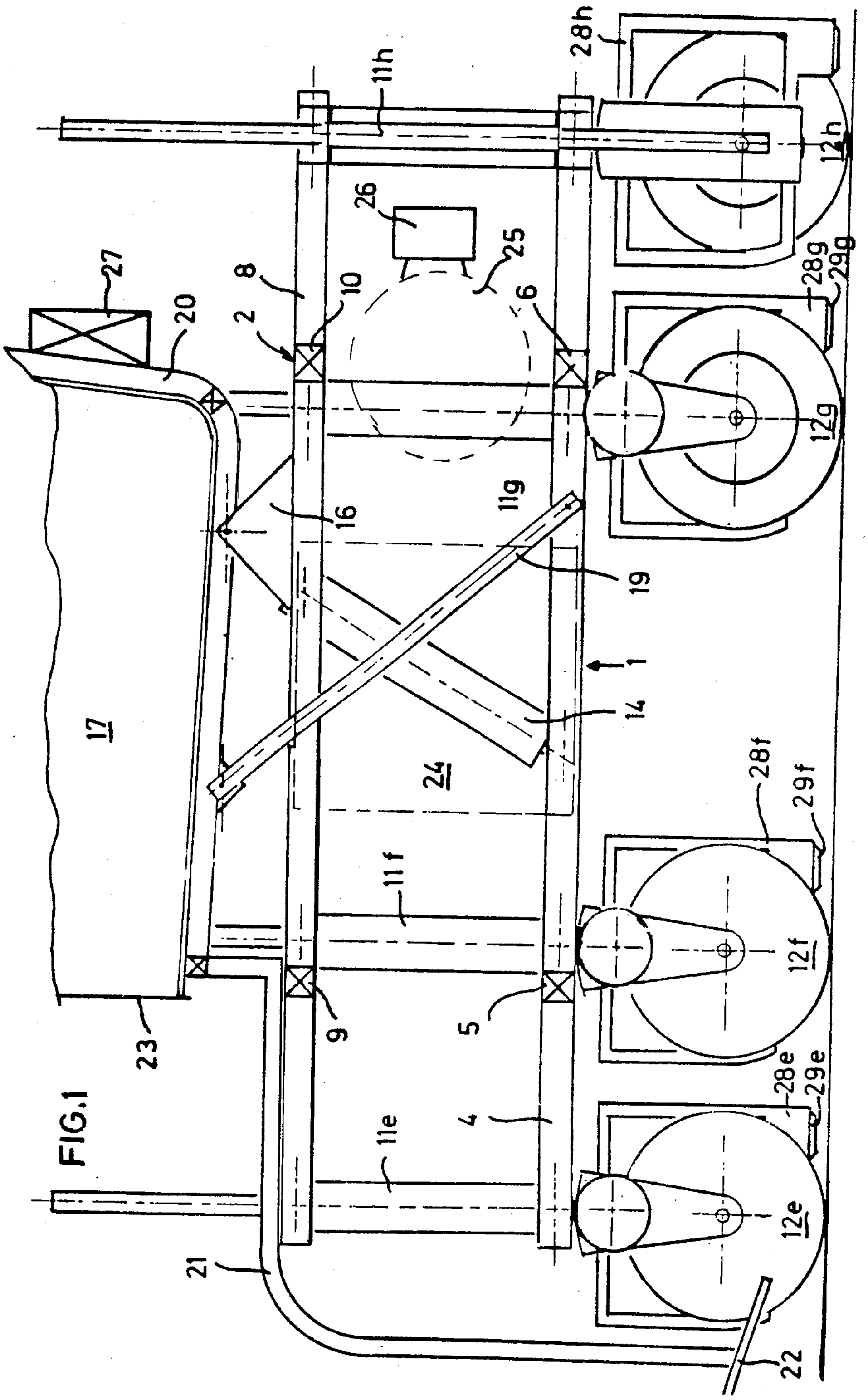

1
2
4
5
6
8
9
10
11e
11f
11g
11h
12e
12f
12g
12h
14
16
17
19
20
21
22
23
24
25
26
27
28e
28f
28g
28h
29e
29f
29g

STAIR CLIMBING WHEELCHAIR

The invention relates to a wheelchair adapted for climbing and descending stairs by utilizing a pneumatic system.

It is an object of the invention to provide a wheelchair for handicapped persons such as that the person sitting in the wheelchair is in principle in the position to drive down and up stairs with this wheelchair without the aid of a further person, where an auxiliary person or an accompanying person would possibly only have the job to exert a safeguarding function for psychological reasons against a too rapid crossing of the individual steps.

This object is achieved by means of a wheelchair comprising a frame comprising an upper sub-frame adjustably linked to a lower sub-frame, a seat adjustably mounted to the frame, groups of wheels supporting the frame, and electric drive means drivingly connected to the groups of wheels for displacing the wheelchair in a horizontal direction. The wheelchair also comprises a first pneumatic drive system connected to the groups of wheels for selectively displacing the wheels vertically, a second pneumatic drive system connected to the frame and to the seat for adjusting the position of the seat relative to the frame, detection means connected to the groups of wheels for detecting the presence of a vertical barrier and the absence of a horizontal support for each group of wheels, and a control unit for actuating the first and second pneumatic drive system to selectively raise or lower groups of wheels while simultaneously adjusting the position of the seat relative to the frame so as to maintain the seat in a horizontal position. By means of this invention, a wheelchair is thus provided which is adapted to climb or descend stairs while maintaining the seat in a horizontal position.

The possibility exists with such a wheelchair that for example the wheel group, which encounters a vertical hindrance present as the edge of a stair step, is lifted up into the region of the flat surface of the step such that the wheelchair can move again in the direction of the stair. Upon each successive hitting by a wheel group against the edge of a step the corresponding wheel groups are lifted up, where an inclined position of the two frames of the motion frame results. With reference to the individual wheel groups of the wheelchair there results an endless track type of moving up along the stair. The stabilization system coordinated to the seat assures that the seat maintains its horizontal position even in case of different relative positions between the upper and the lower frame.

Safety, control and handling provisions are coordinated to the wheelchair in accordance with further embodiments of the invention, as they are described in the subclaims.

In the following, the invention is illustrated in more detail by way of the drawing.

Figure 2:
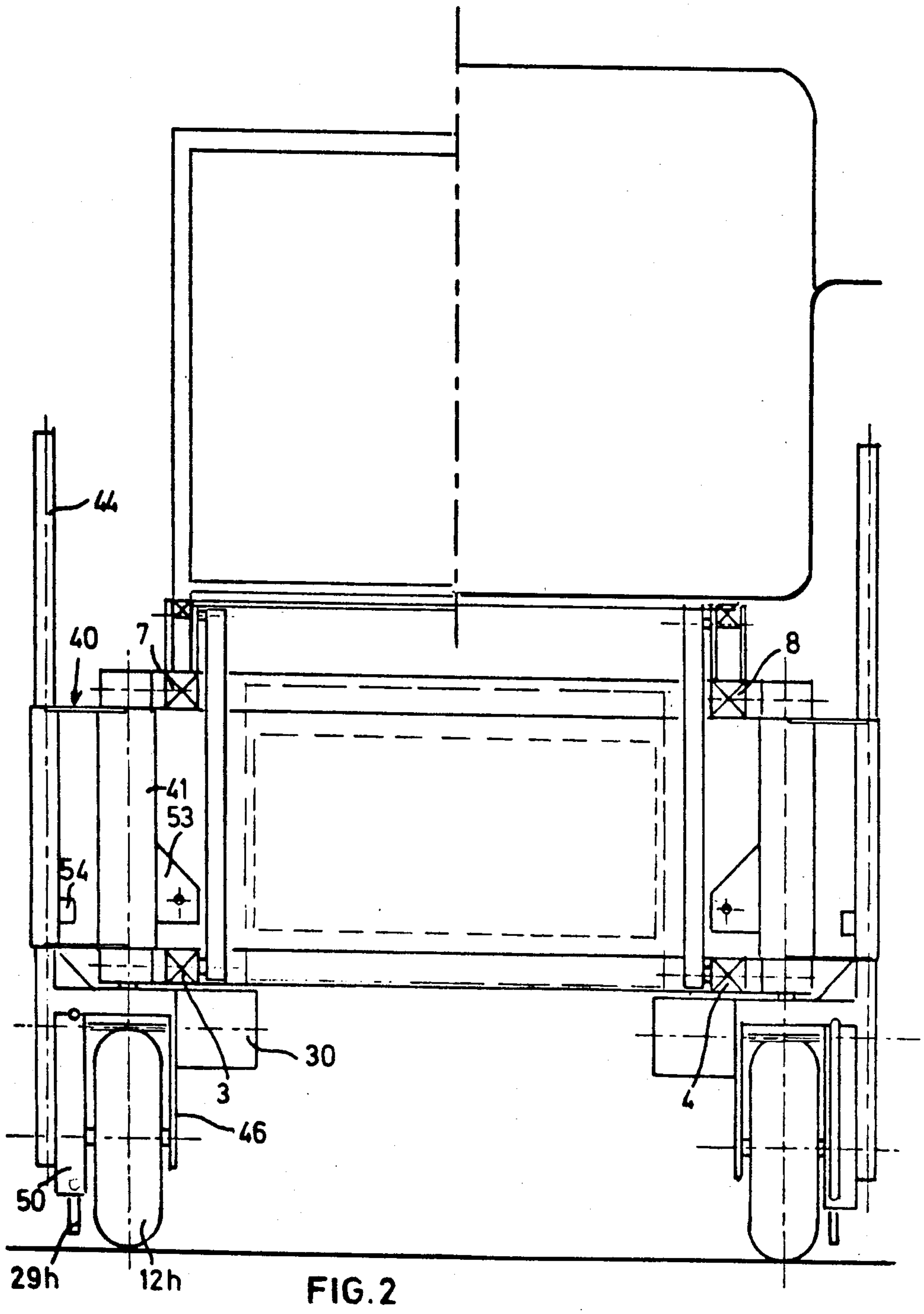
Figure 3:
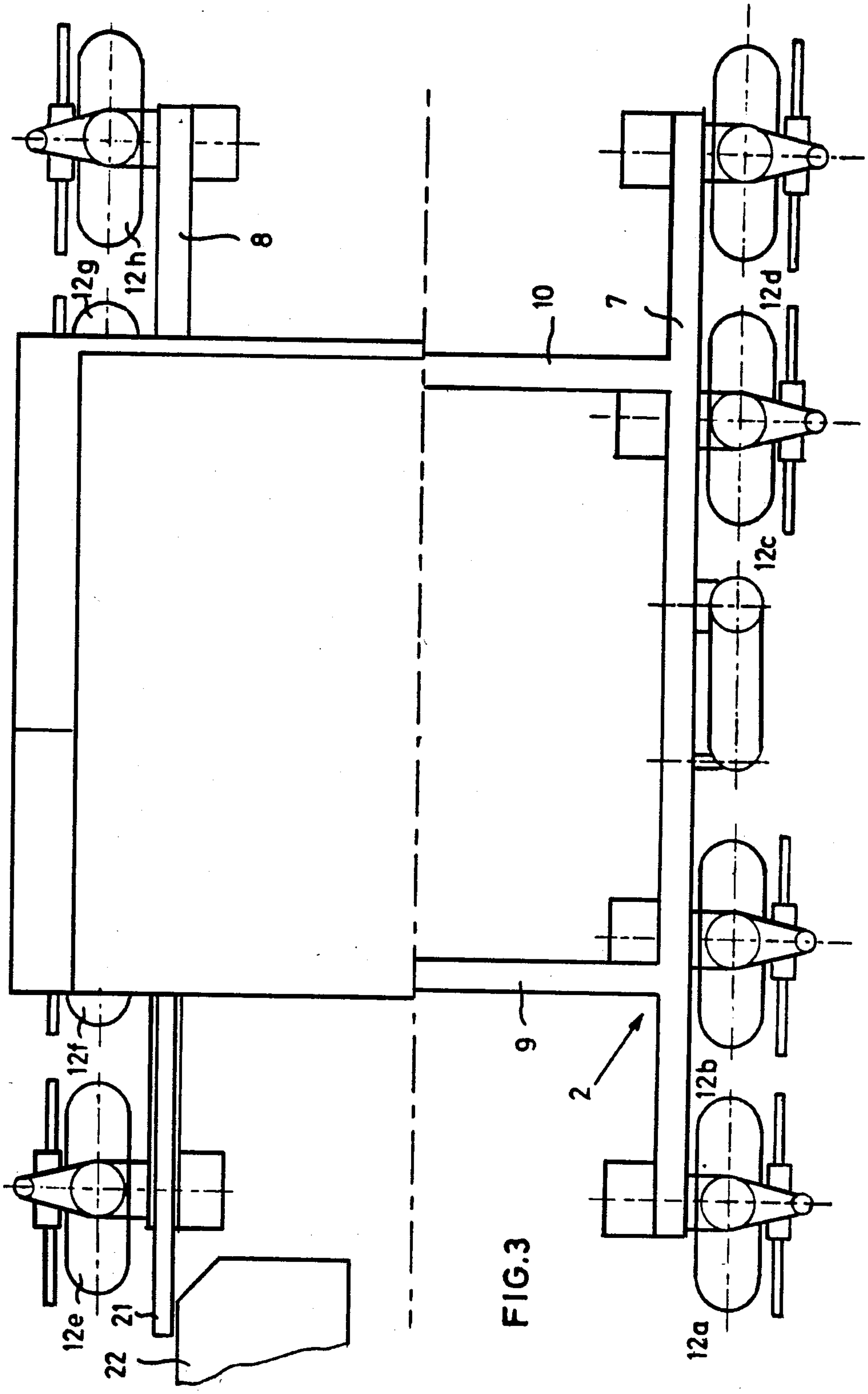
Figure 4:
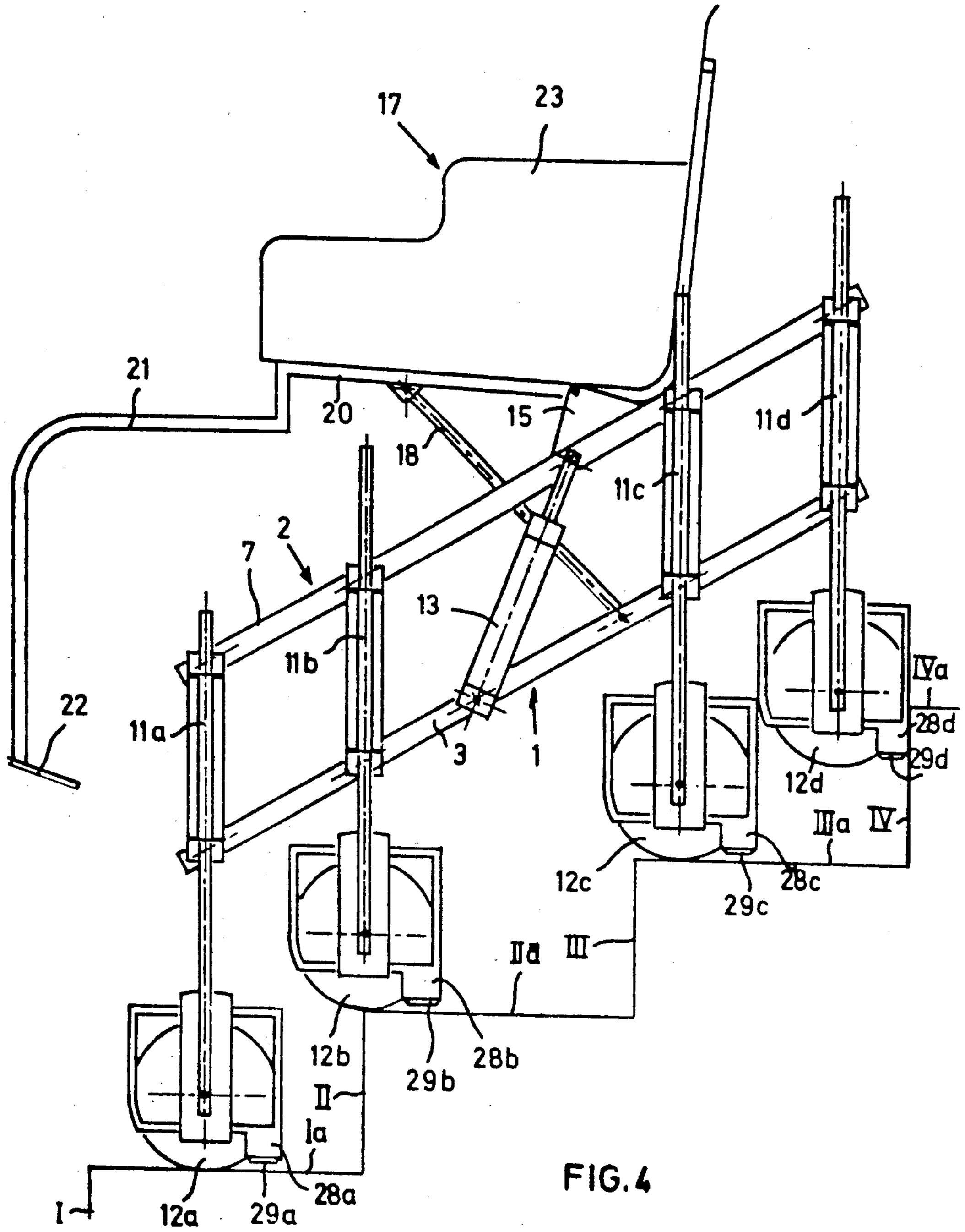
Figure 5:
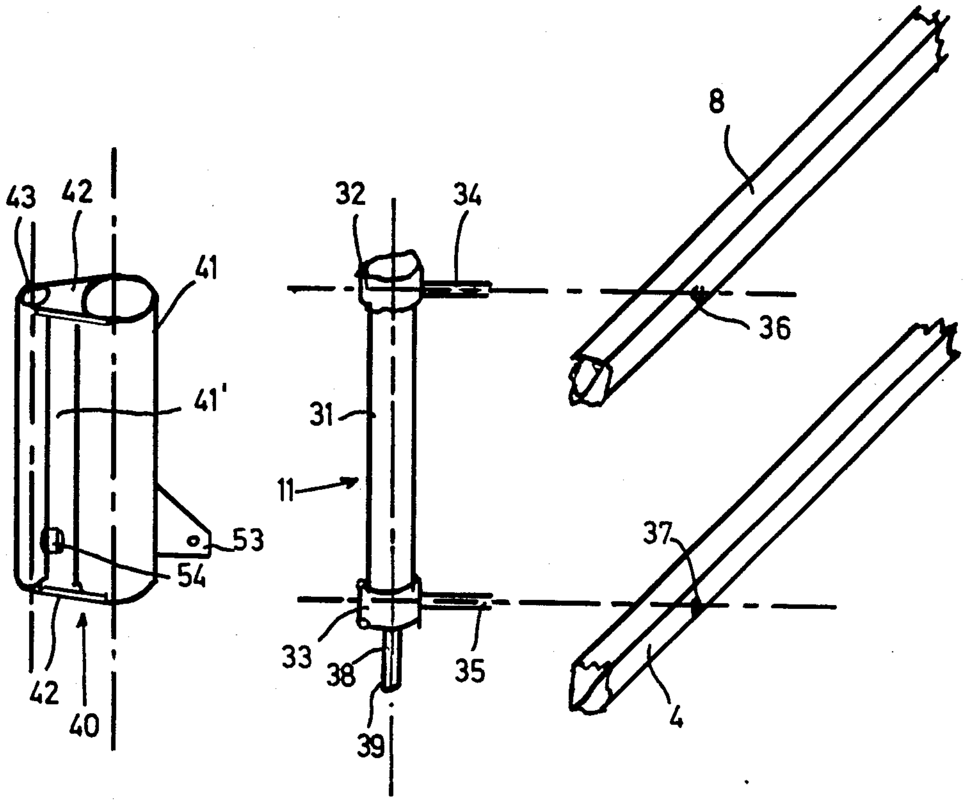
Figure 6:
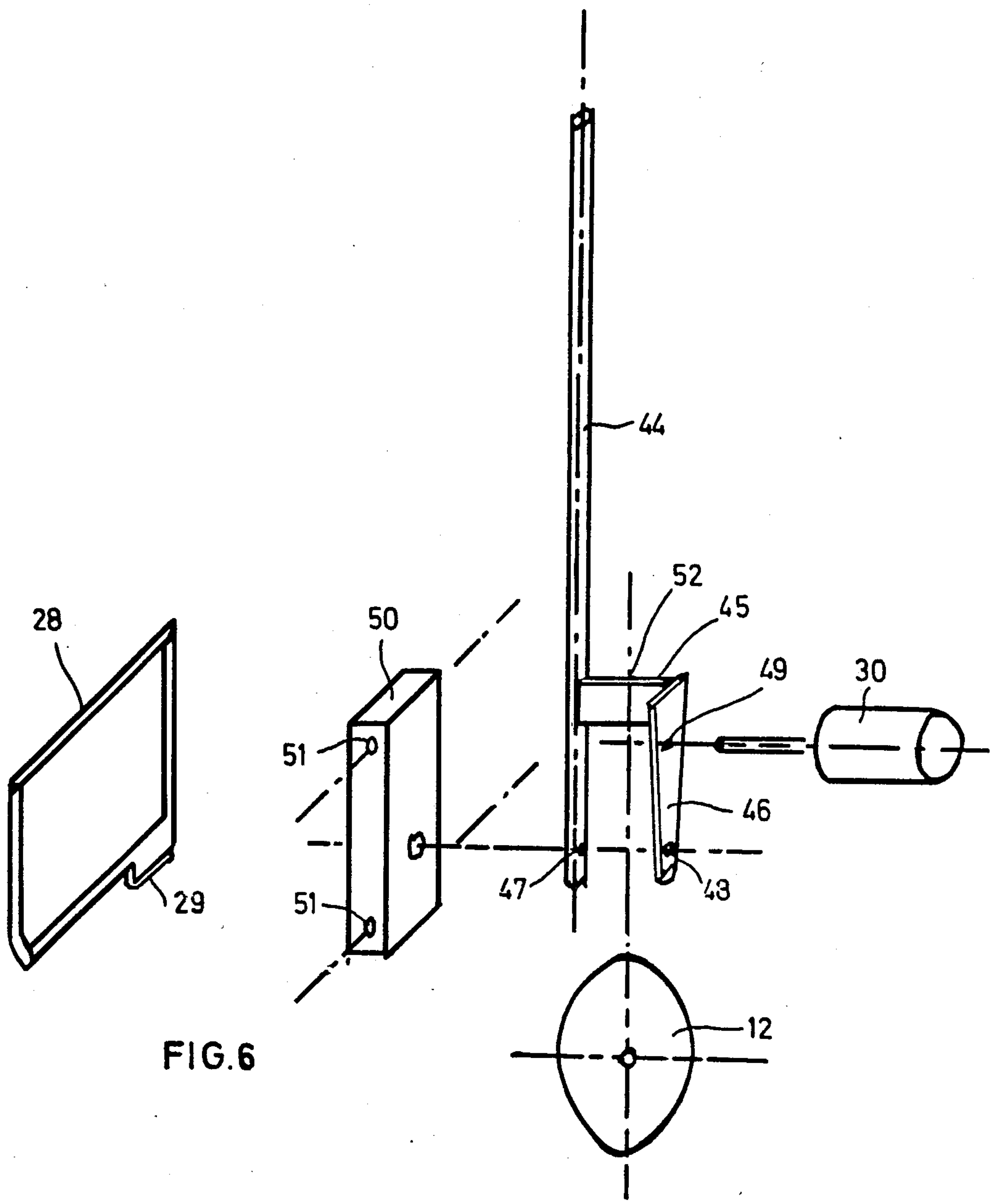
Figure 7:
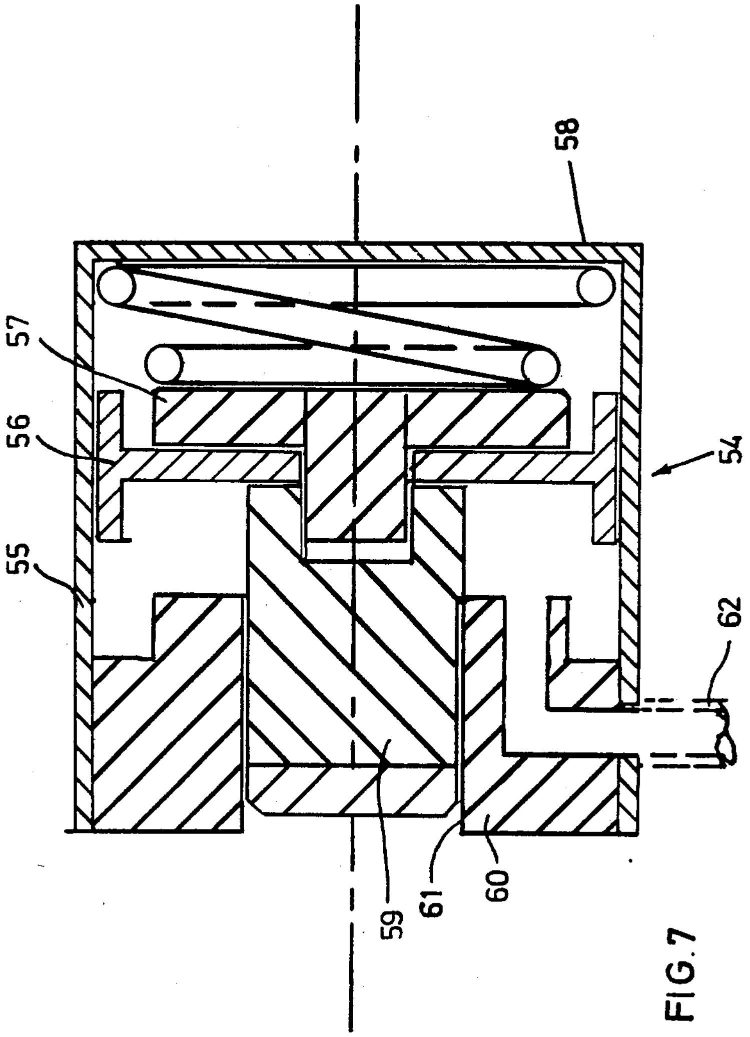

It is shown in:

FIG. 1 a schematic representation of a side view of a wheelchair standing on a planar surface;

FIG. 2 a rear view of the wheelchair on a planar surface;

FIG. 3 a plan view onto the wheelchair;

FIG. 4 a schematic representation of a side view of the wheelchair standing on several steps of a stair;

FIGS. 5 and 6 in each case show details of the wheel support in an exploded view;

FIG. 7 is a sectional view of a pressure switch for the safeguarding of the wheels against unintended adjustment in vertical direction.

The drawings show the various views of a schematically represented wheelchair for handicapped persons. The frame of this wheelchair comprises two frames 1 and 2 disposed on top of each other, in particular constructed from rectangular tube. The lower frame 1 comprises two longitudinal braces 3 and 4 running parallel in driving direction of the wheelchair and two parallel disposed cross braces 5 and 6, which form a middle rectangular frame part at a distance from the ends of the longitudinal braces 3 and 4 and are attached to the longitudinal braces. Preferably, the upper frame has the same shape as the lower frame, that is the upper frame comprises two longitudinally running braces 7 and 8, which are connected to each other by cross braces 9 and 10. The shape of the upper frame 2 and thereby also the shape of the lower frame result in particular from FIG. 3.

Cylinders 11*a* to 11*h* of double acting piston cylinder units are hinged to the two frames 1 and 2 over the length of the longitudinal braces distributed on the two sides of the frames 1 and 2, such that the frames 1 and 2 together with the cylinders in the side projection form a parallelogram linkage, the movability of which results as shown substantially in the FIGS. 1 and 4 (horizontally starting position on the one hand and sloped position on the other hand).

The cylinders 11*a* to 11*h* or, respectively, the corresponding piston cylinder units serve to provide the vertical adjustment of pneumatic wheels 12*a* to 12*h*, the support of which is described further below.

Pneumatic cylinders 13 or, respectively, 14 are hinged in each case between longitudinal braces 3 and 7 disposed on top of each other and 4 and 8 on the other side, which serve to stabilize or, respectively, fix in each case the relative position between the upper and the lower frame.

A seat 17 is tiltably disposed at the upper frame 2 by way of two bearing blocks 15, 16 attached to longitudinal braces 7 or, respectively, 8. Handlebars 18 or, respectively, 19 disposed at the two longitudinal sides of the frame serve to stabilize the seat 17 and the handlebars are on the one hand attached to the lower frame 1 and on the other hand to bottom side of the seat 17. The length of the handlebars 18, 19 as well as the position of the upper and of the lower hinge points are adjusted relative to each other such that independent from the position of the two frames 1 and 2 in each case the same relative position of the seat is assured relative to a horizontal reference plane, as can be gathered from FIGS. 1 and 4. Also other units, preferably in the shape of pneumatic cylinders can be provided for the stabilization of the seat in its horizontal position. The seat 17 essentially comprises a rectangular frame 20, where foot supports 22 are attached via a linkage 21, as well as a seat shell 23.

A drive switch not shown and a steering provision not shown are mounted to the seat 17. Basic further components of the invention wheelchair are a set of batteries 24 rotatably attached to the upper frame 2, a compressed air container 25 rigidly mounted at the lower frame 1 with coordinated compressor 26 and a steering system not shown in detail for controlling the folding of the individual wheel groups.

The compressed air container 25 fed with compressed air from the compressor 26 is connected on the one hand to the cylinders 11*a* to 11*h* as well as on the other hand to the pneumatic cylinders 13 and 14 via lines not shown here. A level control provision 27 is attached to the rear side of the seat 17 associated with a corresponding control device and serves to maintain the preset relative position of the seat 17 relative to the horizontal reference plane and for controlling the supplying of the individual cylinder units 11*a* to 11*h* and 13, 14 with compressed air.

Parallel aligned contact bows 28*a* to 28*h* movable in horizontal direction are coordinated to the wheels forming in each case a group of wheels. The contact bows 28*a* to 28*h* are provided on the one hand with lower bottom contacts 29*a* to 29*h* and they can on the other hand actuate side contacts not shown by way of a horizontal shifting.

An electric drive motor 30*a* to 30*h* is coordinated to each wheel 12*a* to 12*h*. The drive motors are connected to the battery set 24 by way of lines not shown here.

The sequence of operational functioning of the invention wheelchair for driving up ascending stairs is as follows: The drive motors 30*a* to 30*h* drive the wheels 12*a* to 12*h* at low speed in backward direction. If the contact bows 29*d*, 29*h* of the rear wheel pair 12*d*, 12*h* push against the first step riser I and are adjusted in a horizontal direction and thereby actuate the side contacts, microprocessors of all wheel sets integrated into the level control provision and the control device 27 are actuated in order to stop all drive motors 30*a* to 30*h* and to supply on the other hand all other cylinders 11*a* to 11*e* with the exception of the cylinders 11*d*, 11*h* with compressed air, such that the coordinated pistons and thereby the wheels 12*a* to 12*g* are driven downward, whereby the wheel set comprising the wheels 12*d* and 12*h* is lifted up together with the frames 1 and 2 until the coordinated contact bows 28*d* and 28*h* are released, that is they do not any longer contact the step riser I.

New control orders are released within the apparatus 27 based on the thus achieved release of the contact bows 28*d*, 28*h* in such a way that all drive motors 30*a* to 30*h* are driven again in reverse gear.

Upon each successive contacting of a contact bow pair against one of the step risers I, II, III, or VI of a staircase the same or comparable operations repeat in the way that on the one hand the drive motors 30*a* to 30*h* are stopped and that on the other hand certain wheel sets are moved in or out such that in each case the wheel set contacting with its contact bows against one of the step risers is adjusted relative to the other wheel sets. Thereby at the same time an inclined position of the two frames 1 and 2 results, where control orders from the control device 27 on the one hand are transmitted to the cylinders 12*a* to 12*h* and on the other hand to the pneumatic cylinders 13 and 14, in order to control the corresponding inclined slope of the two frames 1 and 2 depending on the state of moving in or moving out of the individual wheel steps.

The individual wheels are blocked against forward motion during the upward motion of the wheel chair.

The following functioning sequence results for the driving down a descending stair: The drive motors 30*a* to 30*h* are driven at a small speed in forward direction. If the front running wheels 12*a*, 12*e* leave the uppermost step surface VIa and immediately thereupon the coordinated floor contacts 29*a*, 29*e* impact this step surface and are loaded thereby, then the pneumatic cylinders 11*a*, 11*e* are blocked. Upon further motion the floor contacts 29*a*, 29*e* are again relieved with the consequence that all drive motors are stopped. At the same time the cylinder units 11*a*, 11*b* are released and drive to the step surface IIIa disposed below. Then the drive motors 30*a* to 30*h* are put again into operation after a time delay controlled by microprocessors such that the wheels 12*a* to 12*h* are driven in forward direction. Upon each following release and reloading of the floor contacts the corresponding control orders are released with the provision that it is always assured that at least three wheel sets remain in contact with the floor and on the other hand the inclined position of the frames 1 and 2 is controlled depending on the height level taken by the individual wheel set depending in turn on the downward motion of the wheelchair in each case.

In order to provide for the case of a sudden pressure drop in the compressed air system, a blocking system is provided in order to block all cylinders 11*a* to 11*h* as well as the pneumatic cylinders 13 and 14 in their position in each case.

The FIGS. 5 and 6 show the support or, respectively, the suspension of the individual wheels including the piston cylinder units with hinged support at the longitudinal braces. The individual piston cylinder unit 11 comprises a cylinder 31, which is provided at its upper and lower ends with radially protruding thicker sections 32 or, respectively, 33. The axle journals 34 or, respectively, 35 are attached at these thicker sections 32 and 33, which axle journals are preferably from a hollow stock in order to connect the upper and lower ends of the cylinder 31 to the compressed air container 25 by way of compressed air lines.

The two longitudinal braces 8 and 4 are provided with bearing bores 36 for the receiving of the axle journals 34 or, respectively, 35. The piston rod 38 protruding from the cylinder 31 has a threaded section 39 at its lower end.

A parallel guiding element 40 is slid onto the cylinder 31 between the radially thicker sections 32 and 33. For this purpose at least one of the two thicker sections 32 or 33 is demountably attached to the cylinder 31. The parallel guiding element 40 comprises a first tube section 41 surrounding the cylinder 31 and the lower and upper trapezoidal stiffening plates 42 are rigidly connected to a second tube section 43 running parallel to the first tube section 41.

A steering strap 53 is attached on the side of the first tube section 41 of the parallel guiding element 40.

The second tube section 43 serves to provide the shiftable support in axial direction of the parallel guide tube 44 shown in FIG. 6, which is assured against a rotation relative to the second tube section 43. A cross bow 45 is attached in the region of the lower section of the parallel guide tube 44 and a bearing check 46 is attached to the cross bow 45, which bearing cheek 46 again runs in parallel to the parallel guide tube 44. The cross bow 45 is provided with a threaded bore 52 open toward the top and the threaded shaft 39 of the piston rod 38 is screwed into the threaded bore 52. Bearing bushings 47 or, respectively, 48 for receiving the axis of a wheel 12 are disposed at the lower ends of both the parallel guide tube 44 as well as of the bearing cheek 46. The cheek 46 is provided with a further support bore 49 for the attachment of a drive motor 30, which serves to drive the wheel 12 via usual drive elements not shown here in detail.

A contact box 50 is attached at the lower end of the parallel guide tube 44 preferably in the region of the bearing bushing 47, which serves a contact bow 28 with horizontally disposed guide bores 51. The contact bow 58 carries the floor contact 29 described above at its bottom side. The contact bow 28 can be slid with regard to the contact box 50 in horizontal direction against an elastic pretensioning force in order to be able to actuate the side contacts disposed in the contact box 50 in the way described already above.

Upon supplying the piston cylinder unit 11 with compressed air the piston rod 38 is either moved inward or outward, whereby a correspondingly directed force is transferred onto the cross bow attached at the parallel guide tube 44. The parallel guide tube 44 is thereby adjusted in vertical direction within the second tube section 43 and thereby also the wheel 12 supported between the lower end of the parallel guide tube 44 and the bearing cheek 46.

A pressure switch 54 is coordinated to the second tube section 43 and thus to the parallel guide tube 44 (compare FIGS. 2, 5 and 7).

The pressure switch 54 attached on the side of the second tube section 43 in the region of a wall opening comprises a cylinder casing 55, which shiftably supports a plunger 56. This plunger 56 is on the one side loaded with a spring 58, which exerts on the plunger 56 a force in such a direction that a pressure stamp 59 disposed on the other side of the plunger, which is supported slidably in an opening 61 of a cylinder cover 60, is moved out of the cylinder to such an extent that it is pressed against the parallel guide tube 44 through the above recited wall opening of the second tube section 43 in the contact and bolting position. A compressed air line 62 joins the cylinder space of the cylinder 55 disposed toward the cylinder cover 60, which pressure line 62 is also connected to the compressed air container 25. In order to adjust a wheel there is also required a supplying of compressed air to the plunger 56 of the coordinated pressure switch 54 in addition to the supplying of compressed air to the cylinder 31 in each case. The supplying of compressed air to the plunger 56 allows to move the pressure piston 59 against the force of the spring 58 from the position moved into the second tube section 43 and bolting the parallel guide tube 44. As soon as the parallel guide tube 44 has reached again a final position, the supplying of compressed air to the plunger 56 is interrupted such that the pressure piston 59 is moved into its position locking the parallel guide tube under the influence of the force of the spring 58.

The pressure switch 54 thus fulfills the purpose to prevent uncontrolled vertical repositionings of the individual wheels in case of interferences in the compressed air system.

A steering system or a steering linkage not shown engages the individual steering straps 53 of the parallel guide elements 40 in a way not part of the invention. In order to set the trace of the individual wheels, the individual parallel guiding element 40 is turned with its first tube section 41 around the axis of the cylinder 11, which entails a corresponding tilting motion of the second tube section 43. This tilting motion is followed by the parallel guide tube 44 secured within the second tube section against rotation, which results in a corresponding change of the course or, respectively, steering position of the individual wheel 12.

I claim:

1. A wheelchair adapted for climbing and descending stairs, comprising a frame, said frame comprising an upper subframe adjustably linked to a lower subframe, a seat adjustably mounted to said frame, groups of wheels supporting said frame, electric drive means drivingly connected to said groups of wheels for displacing said wheelchair in a horizontal direction, first pneumatic drive means connected to said groups of wheels for selectively displacing said groups of wheels vertically, second pneumatic drive means connected to said frame and to said seat for adjusting the position of said seat relative to said frame, detection means connected to said groups of wheels for detecting the presence of a vertical barrier and the absence of a horizontal support for each group of wheels and for generating signals in response thereto, and control means for generating signals to actuate said first and second pneumatic drive means to selectively raise or lower groups of wheels and to simultaneously adjust the position of said seat relative to said frame so as to maintain said seat in a horizontal position in response to signals received from said detection means, whereby said wheelchair is adapted to climb or descend stairs while said seat is maintained in a horizontal position.

2. The wheelchair of claim 1 wherein said upper subframe is parallel to said lower subframe.

3. The wheelchair of claim 1 wherein said upper subframe and said lower subframe assume a parallelogram linkage when said wheelchair is climbing or descending stairs.

4. The wheelchair of claim 1 wherein each of said groups of wheels is perpendicular to the plane of the ground when said wheelchair is climbing or descending stairs.

5. The wheelchair of claim 1 wherein each of said groups of wheels has a separate electric drive means associated with it.

6. The wheelchair of claim 1 wherein said control means further controls operation of said electric drive means.

7. The wheelchair of claim 1 wherein said seat is hinged to said upper subframe.

8. The wheelchair of claim 1 further comprising side handlebars hinged to said lower subframe and to said seat.

9. The wheelchair of claim 1 wherein said electric drive means is powered by batteries mounted to said frame.

10. The wheelchair of claim 1 wherein said control means includes at least one microprocessor.

11. The wheelchair of claim 1 wherein said first and second pneumatic drive means are air driven.

12. The wheelchair of claim 1 wherein said detection means are mechanical detection means.

13. The wheelchair of claim 1 comprising four groups of wheel pairs.

* * * * *